April 27, 1954 — T. H. RISK — 2,676,708
TILT SAFETY VALVE FOR FILTERS
Filed Jan. 20, 1950
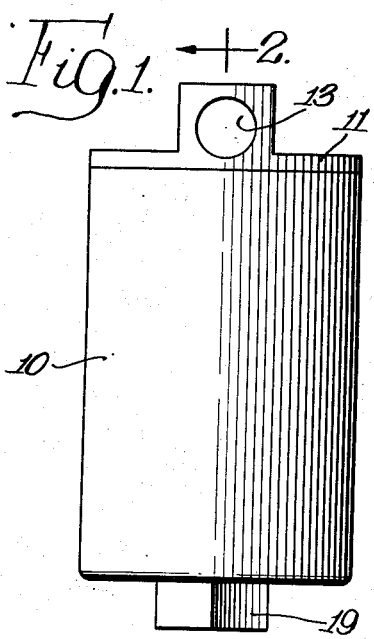
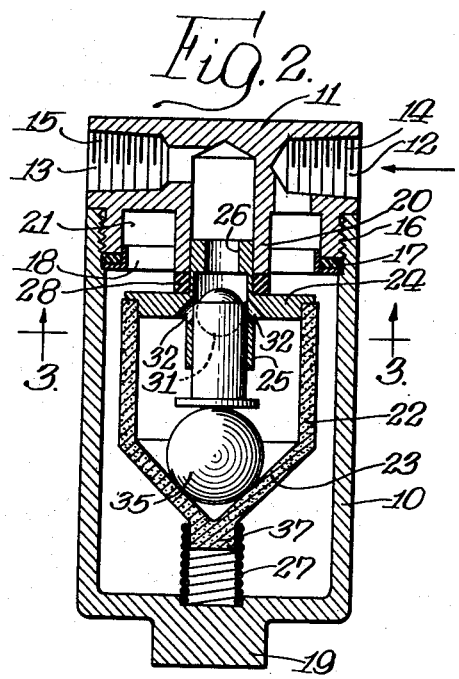
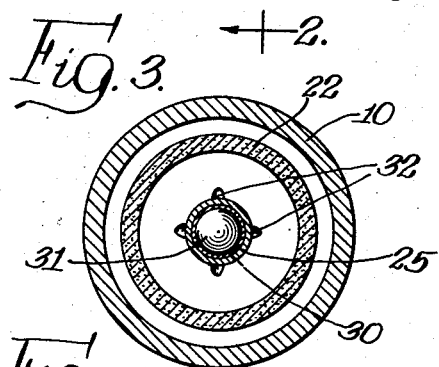
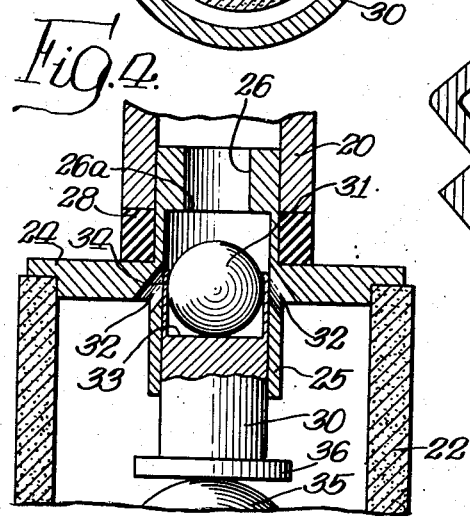
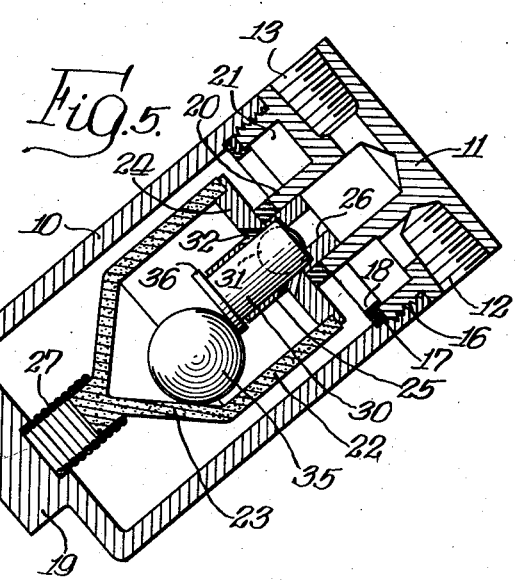
INVENTOR.
Thomas H. Risk,
BY Schroeder, Merriam,
Hofgren & Brady, Atty's.

Patented Apr. 27, 1954

2,676,708

UNITED STATES PATENT OFFICE 2,676,708

TILT SAFETY VALVE FOR FILTERS

Thomas H. Risk, Franklin, Mich.

Application January 20, 1950, Serial No. 139,647

4 Claims. (Cl. 210—166)

This invention relates to a safety device and particularly to a combined fuel filter and valve for use in the fuel line leading to an engine, which device both filters the fuel and stops the flow of fuel to the engine upon tilting of the device beyond a predetermined slope.

An object of this invention is to provide a new and improved safety device of the character described.

Another object is the provision of a device of the character described which may be placed in the fuel line of a motor vehicle or the like to filter the fuel passing from a storage reservoir to the motor and to stop the flow of fuel to the motor upon overturning of the vehicle or tilting thereof beyond a predetermined slope.

Another object is the provision of apparatus of the character described having means for connecting a portion of the device permanently in the fuel line leading to the motor of a vehicle and having a removable portion permitting easy access to the parts of the device with means permitting ready reassembling of the parts.

Another object is the provision of a device of the character described including a safety valve having a valve closure loosely carried in a valve thimble, movable toward a valve seat automatically upon tilting of the device and in which said valve closure positively seals the fuel passage to stop all flow of fuel to the engine of the vehicle with which the device is used.

A further object is the provision of a safety valve adapted to shut off fuel flow therethrough comprising a valve seat and a spherical valve closure mounted in the end of a valve thimble slidably movable in a sleeve adjacent the valve seat, with the play between the spherical closure and valve thimble exceeding the play between the valve thimble and sleeve.

Other objects, advantages and features of this invention will be apparent from the following description taken in connection with the accompanying drawing of an embodiment of the invention, in which:

Fig. 1 is an elevational view of the assembled device;

Fig. 2 is a cross sectional view taken substantially along line 2—2 in Fig. 1;

Fig. 3 is a cross sectional view taken along the line 3—3 in Fig. 2;

Fig. 4 is an enlarged fragmentary view of the valve closure means illustrated in Fig. 2; and Fig. 5 is a view similar to Fig. 2 with the device tilted at approximately an angle of 45° to vertical.

While my invention is susceptible of embodiment in many different forms, I have shown in the drawings and will herein describe in detail one specific embodiment, with the understanding that the present disclosure is to be considered as an exemplification of the principles of the invention and is not intended to limit the invention to the embodiments illustrated. The scope of the invention will be pointed out in the appended claims.

The device of this invention is intended for use with a motor vehicle or other equipment powered by motor means by insertion of the device in the fuel line of the vehicle leading from a fuel reservoir to the motor. It is desirable that the fuel supply, passing to the motor of a vehicle, be shut off in the event that the vehicle is turned over or is otherwise tilted from its normal position, thus preventing a continued running of the motor. The invention comprises generally a housing threadably secured to a cap having separate inlet and outlet passages adapted to be permanently fixed in the fuel line leading from the fuel storage to the motor. All fuel passing to the motor must pass through the device and through a filter element within the housing and past a safety valve which is adapted to automatically close should the vehicle tilt beyond a predetermined angle to the vertical.

In the drawings, a housing 10 is threadably secured to a cap 11 having an inlet fuel passage 12 communicating with the interior of the housing 10 and an outlet passage 13 also opening to the interior of the housing 10. The fuel inlet and outlet passages have threads 14 15, respectively, for connecting the cap 11 into the fuel line of a motor vehicle, or the like. It is preferable that the cap 11 be so connected in the fuel line that the housing 10 depends substantially vertically from the cap. As best seen in Fig. 2 the housing is provided with internal threads 16 at its upper end which may be secured to corresponding threads on the cap 11. A sealing ring 17 mounted in an annular angle-shaped retainer 18 is seated in the upper portion of the housing 10 adjacent the threads 16 to perfect a seal between the housing and the cap. An integral nut 19 is provided on the bottom of the housing 10 for receiving a wrench with which the housing 10 may be tightly secured to the cap 11 which generally is permanently fixed in the fuel line of the vehicle.

The outlet fuel passage 13 communicates with the interior of a central boss 20 downwardly extending from the center of the cap 11. The inlet fuel passage 12 opens to an annular space 21 surrounding the center boss 20 to ensure an even flow of fuel to the interior of the housing 10 about the filter element as hereinafter described.

A filter element is placed within the housing 10 and in the path of all fuel passing between the inlet passage 12 and outlet passage 13. The element is here shown as a generally cylindrical cup 22 having a conical shaped bottom portion 23. The filter element 22 may be of any suitable material such as sintered bronze and preferably provides fuel passages through the walls of the element about its entire periphery. A metallic closure 24 is fitted to the upper end of the filter element 22 and has a center sleeve 25 of an outer diameter adapted to fit slidingly into the boss 20 in the cap 11. The sleeve 25 has a slightly restricted opening 26 in its upper portion above the closure 24 forming a valve seat 26a, and also extends below the closure 24 into the interior of the filter element 22. The spring 27 serves the function of urging the filter element 22 upwardly against an inner sealing ring 28 positioned about the sleeve 25 and against the lower end of the boss 20. The sealing ring 28 thus allows no leakage of the fuel from the inlet passage 12 to the outlet passage 13 without passing through the filter element 22. When the housing 10 is removed from the cap 11 a compression spring 27 acting against the bottom of the housing 10 and the bottom of the filter element 22, forces the element upwardly out of the top of the housing. The angle shaped retainer 18 holding the sealing ring 17, is of an inner diameter to loosely fit about the filter element and substantially align the element centrally within the housing. By the cooperation of the retaining ring 18 and the compression spring 27 the sleeve 25 of the closure 24 projects upwardly from the rim of the housing 10 so that the boss 20 of the cap 11 may easily and conveniently be placed over the sleeve to guide the filter element 22 into its proper position within the housing 10.

The safety valve of this invention is mounted within the filter element 22 and the sleeve 25 integral with the closure 24 for the filter element. The structure of the safety valve is illustrated in the enlarged view of Fig. 4 and comprises a valve thimble 30 slidingly seated in the sleeve 25 and carrying a spherical valve closure 31 in its upper end. Ordinarily, fuel passing through the filtering element 22 passes through openings 32 and then upwardly through the restricted opening 26 into the outlet passage 13. The spherical valve closure 31 has a diameter larger than the diameter of the restricted opening 26 and may be carried upwardly by the valve thimble 30 to contact the periphery 26a of the opening 26, thus shutting off the flow of fuel through the device which will, of course, cause the motor to cease running. In order to ensure that the spherical member 31 positively seats itself in the periphery 26a of the opening 26, the member 31 rests on a flat surface 33 in the upper end of thimble 30 and is retained in the thimble by an upwardly extending collar 34 which loosely holds the member 31 permitting some degree of lateral movement of the member 31 over the flat surface 33. The amount of "play" between the spherical member 31 and upwardly extending collar 34 is greater than the amount of "play" between the walls of the thimble 30 and the sleeve 25 so that the member 31 may positively seat itself in the valve seat 26a.

As above mentioned the filter element 22 has a conical shaped bottom 23, here shown as having a slope of about 45°. A heavy ball 35 rests upon the conical shaped bottom 23 and bears against a flange 36 integral with the valve thimble 30. As illustrated in Fig. 5 the ball 35 will roll over the conical shaped bottom 23 when the device is tilted at an angle of 45° or more from vertical. As the ball 35 rolls over the conical surface, it forces the valve thimble 30 upwardly through the sleeve 25 to seat the spherical valve closure 31 against the periphery of the restricted opening 26, thus shutting off flow of fuel to the motor of the vehicle. When the spherical member 31 is seated against the periphery of the opening 26 the ball 35 is still spaced a short distance from the generally cylindrical walls of the filter element 22 so that any wear of the ball 35 will not prohibit a full closure of the opening 26.

The flow of fuel through the inlet passage 12 spreads around the boss 20 and is supplied evenly to the filter element 22. Four openings 32 are evenly spaced around the center sleeve 25 to provide a clear passage for the fuel from the center of the filter element to the outlet passage 13. With this structure no vapor lock is encountered. Foreign particles in the fuel are trapped by the filter element 22 and water or other undesirable matter in the fuel will generally collect in the bottom of the housing 10 from which it may be removed periodically as desired, by simply removing the housing from the cap 11. The filter element 22 has a bottom lug 37 which loosely fits within the coils of the spring 27 and may be easily removed from within the housing 10 so that all parts of the device may be quickly and easily disassembled for cleaning and inspection.

It is believed apparent from the foregoing that this invention provides a new and useful fuel filter and safety valve for use in conjunction with motor vehicles and the like.

I claim:

1. A safety valve device for use in the fuel line of an engine comprising, a cylindrical housing, an annular sealing ring member seated in the upper portion of the housing, a cap threadedly mounted on the housing in sealing engagement with the sealing ring member, a cylindrical filter element slightly smaller in diameter than said sealing ring member, a compression spring mounted between the bottom of the housing and the bottom of the filter element and holding said element in a position extending through said sealing ring when the cap is off the housing, said cap having a center boss forming part of an outlet fuel passage to the interior of the filter element and an inlet fuel passage communicating with the space around the element, a tubular member forming a portion of said filter element and having passages therein completing communication of the outlet fuel passage with the interior of said filter, said boss being adapted partially to receive said tubular portion of the filter element to center the element in the housing, and a sliding valve mounted in the outlet fuel passage, said filter element having a conical bottom, a ball within the filter element abutting the lower end of the sliding valve for closing the valve on tilting the device to a position in which one line segment of the conical bottom slopes outwardly and downwardly with respect to the horizontal.

2. A safety valve device adapted for vertical mounting in the fuel line of an engine comprising, a housing, a removable cap for the housing having inlet and outlet fuel passages therein, a generally cylindrical filter element having a conical bottom and positioned within the housing, one of said fuel passages having a restricted opening and communicating through the restricted opening with the interior of the filter element, the other with the space exteriorly thereof, a valve thimble mounted adjacent said restricted opening and carrying a spherical valve closure loosely supported on a flat surface and projecting from said thimble, and an actuating ball freely rollable on said conical bottom and adapted to advance the valve thimble toward the opening to seat the spherical element therein upon tilting of the device to a position in which one line segment of the conical bottom slopes outwardly and downwardly with respect to the horizontal.

3. A safety valve device for use in a fuel line leading to an engine comprising a cylindrical housing, a cap threadably attached thereto and having an inwardly extending hollow boss forming a fuel outlet passage from the center of the cap, a depending peripheral flange defining an annular space around said boss and a fuel inlet passage opening to said space, a cylindrical filter element within the housing having a conical bottom, a closure fitted to the top of said element and having a center sleeve extending both above and below the closure, means surrounding said sleeve forming a seal between said closure and the boss, said sleeve having an outer diameter adapting it to fit into the boss in said cap for centering said filter within said housing, said sleeve having a restricted opening at its top forming a valve seat, and passages through the sides of the sleeve opening at one end to the interior of said filter and at the other end to said sleeve near the valve seat end thereof, a valve thimble slidingly received in the end of said sleeve opposite the restricted opening and loosely carrying a spherical valve element in the end adjacent said restricted opening, said thimble and valve element in unseated position permitting flow through the passage in said sleeve, and a ball resting within the filter element on the conical bottom and bearing against the lower end of said thimble whereby said ball will force the spherical valve element against the restricted opening to stop flow of fuel upon tilting of the device a sufficient amount to cause the ball to roll over the conical bottom.

4. A safety valve device for use in the fuel line of an engine comprising a cylindrical housing, a cap for the housing having an outlet fuel passage communicating with the center of the housing, an inlet fuel passage opening to said housing intermediate its periphery and said outlet passage, a generally cylindrical filter element having a conical bottom and positioned in the housing between the inlet and outlet fuel passages, a closure for the filter element having a center sleeve with a restricted opening therein extending into the outlet passage and with a port providing communication between the interior of said filter element and the interior of said sleeve, means sealing the connection between said sleeve and said outlet passage, a valve thimble slidingly held in the end of said sleeve opposite said restricted opening and having a normal and an actuated position, said port being formed in said sleeve intermediate the restricted opening therein and said thimble when the latter is in its normal position, and a heavy ball resting on said conical bottom and abutting the lower end of said thimble whereby tilting of the device causes said ball to roll over the conical bottom raising the valve thimble to its actuated position against the restricted opening to stop flow of fuel to the engine .

References Cited in the file of this patent

UNITED STATES PATENTS

| Number | Name | Date |
| --- | --- | --- |
| 988,550 | Davis | Apr. 4, 1911 |
| 1,076,128 | Kupferle | Oct. 21, 1913 |
| 1,683,338 | Evinrude | Sept. 4, 1928 |
| 1,781,964 | Thomas et al. | Nov. 18, 1930 |
| 1,859,479 | Thwaits | May 24, 1932 |
| 2,079,775 | Simons | May 11, 1937 |
| 2,342,659 | Grove | Feb. 29, 1944 |
| 2,342,669 | Hoffman | Feb. 29, 1944 |
| 2,488,921 | Mathews | Nov. 22, 1949 |

FOREIGN PATENTS

| Number | Country | Date |
| --- | --- | --- |
| 188,059 | Great Britain | Oct. 30, 1922 |